UNITED STATES PATENT OFFICE.

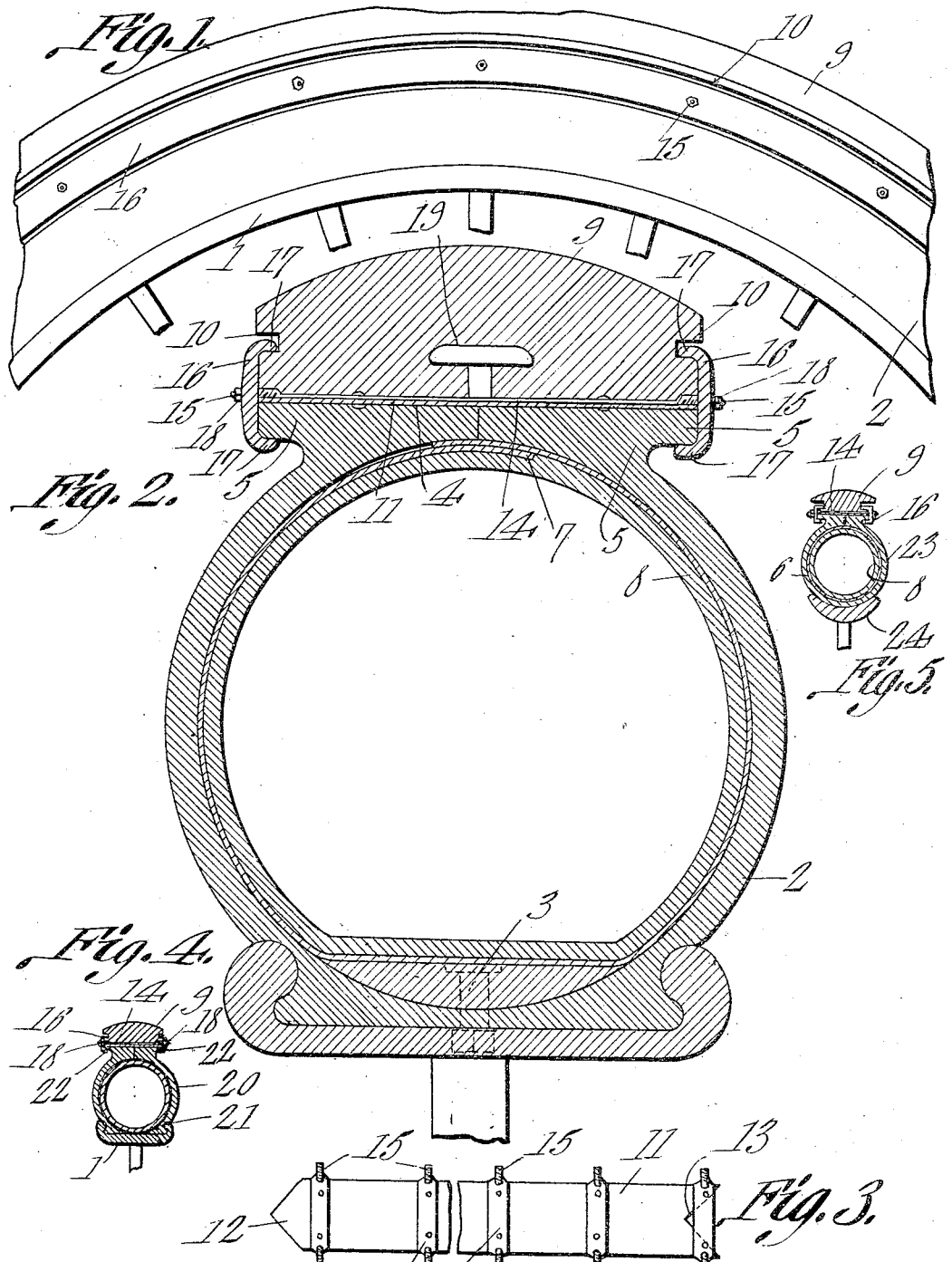

GEORGE A. SHAW, OF BARBERTON, OHIO.

PNEUMATIC TIRE.

1,057,676.

Specification of Letters Patent. Patented Apr. 1, 1913.

Application filed November 27, 1911. Serial No. 662,721.

*To all whom it may concern:*

Be it known that I, GEORGE A. SHAW, a citizen of the United States, residing at Barberton, in the county of Summit and State of Ohio, have invented a new and useful Pneumatic Tire, of which the following is a specification.

This invention relates to pneumatic tires of that type especially designed for use upon automobile wheels, and its object is to provide a tire of this character having an outer tube on which is detachably mounted a resilient tread, there being means interposed between the tread and the outer tube and which coöperates with clamping devices for holding the outer tube in position around the inner tube of the tire.

A further object is to provide a tire the outer tube of which is designed to be opened along the periphery thereof, thus permitting access to be conveniently had to the inner tube without the necessity of removing the outer tube from the wheel rim.

A further object is to provide novel means for securing the detachable tread to the outer tube of the tire, said means being readily adjustable for the purpose of taking up wear of the parts.

With these and other objects in view the invention consists of certain novel details of construction and combination of parts hereinafter more fully described and pointed out in the claim.

In the accompanying drawings the preferred form of the invention has been shown.

In said drawings:—Figure 1 is a side elevation of a portion of a tire and wheel embodying the present improvements. Fig. 2 is an enlarged transverse section through the tire and through the rim of the wheel. Fig. 3 is a detail view of the combined shield strip and ring-retaining device. Fig. 4 is a transverse section on a reduced scale, through a modified form of tire, embodying the present improvements. Fig. 5 is a view similar to Fig. 4 and showing another modified form of tire.

Referring to the figures by characters of reference 1 designates the rim of a wheel engaged by the outer tube 2 of the tire, said tube being held to the rim by a metal band 3 formed of two or more sections bolted or otherwise fastened to the rim. The edge portions of this tube 2 are brought together at the periphery of the tire and are enlarged annularly to present a flat peripheral portion 4 and laterally extending beads 5. This outer tube may be provided with a lining 6 of canvas or other suitable material, the edges of the lining being free to constitute aprons 7, designed to lap when the parts of the tire are properly assembled. The inner tube 8 of the tire is of the usual or any preferred construction and is designed to be entirely inclosed by the lining 6 and aprons 7 and by the outer tube 2.

The tread portion 9 of the tire is preferably formed of a ring of solid rubber or any preferred composition and is provided in its side faces with grooves 10. An elongated shield strip 11 of thin sheet metal is arranged upon the flat peripheral portion 4 of the outer tube 2 and extends entirely around said outer tube, the ends of the shield strip interlocking in any preferred manner. In Fig. 3 this shield strip has been shown with a reduced end 12 and a recessed end 13, one end being designed to fit within the other when the shield strip is extended entirely around the tube 2.

Arranged transversely upon the shield strip 11 at desired intervals are cross strips 14 which are riveted or otherwise secured in place and are provided at their ends with threaded studs 15 extending at right angles from the edges of the shield strip 11. The studs 15 are designed to extend loosely through openings formed within clamping rings 16 arranged upon the sides of the tread 9 and the beads 5. Each of these rings has inwardly extending flanges 17, one flange of each ring being designed to extend back of the adjoining bead 5, while the other flange is designed to project into the adjoining groove 10. By placing nuts 18 on the studs 15 and tightening them the rings 16 can be drawn together so as to firmly engage the tread 9 and beads 5, and thus securely tie the tread to the outer tube 2 and at the same time hold the said outer tube closed about the inner tube 8. This movement of the rings 16 toward each other is permitted in view of the fact that said rings are normally spaced from the side edges of the shield strip. If desired headed studs 19 may be extended from the strip 11 and embedded in the tread.

By constructing a tire in this manner, it obviously becomes impossible to puncture the same. The tread 9 constitutes a soft bearing surface for the tire, but should any sharp object be forced thereinto it will be prevented from entering the outer tube 2 by the metal shield strip 11. Should it be desired to reach the inner tube 8 of the tire it is merely necessary to detach one of the rings 16 from the studs 15, whereupon tread 9 can be removed and the portions 4 of the outer tube spread apart. Should the tread or the beads become worn as the result of constant use the rings 16 can be adjusted toward each other by tightening the nuts 18.

Instead of forming the outer tube 2 in a single piece of material the same can be formed of two parts as indicated in Fig. 4. Each of the sections 20 shown in Fig. 4 has an enlargement 21 at its inner edge designed to engage the clencher rim 1, and another enlargement 22 is formed at the other edge of the section and corresponds with the enlargements 5 heretofore referred to. It is of course to be understood that a tread such as shown in Fig. 2, and a shield strip and clamping rings are to be used in connection with this modified form.

In Fig. 5 a modified form of tire has been shown wherein the outer tube is to be cemented to the rim. Otherwise this structure may be the same as that disclosed in Fig. 1, it being possible to use it either with or without the parts 3 and 19. The outer tube in this Fig. 5 has been illustrated at 23 and the rim at 24.

What is claimed is:—

In a pneumatic tire, an outer tube having enlarged peripheral edge portions coöperating to form a bearing surface, a tread extending around the outer tube and removable therefrom, a metallic strip wrapped about the outer tube and interposed between said tube and the tread, said strip having interengaging ends and said strip constituting a shield, cross strips secured upon the first named strip and having integral threaded studs extending from the ends thereof and beyond the sides of the shield strip, and means adjustably mounted on the threaded studs for engaging the enlarged portions of the tube and for engaging the tread to hold said tread upon said tube.

In testimony that I claim the foregoing as my own, I have hereto affixed my signature in the presence of two witnesses.

GEORGE A. SHAW.

Witnesses:
 CORA G. HOLLINGER,
 WILBURN MURPHY, Jr.